Aug. 9, 1927.

J. E. F. CAMBESSÉDÈS 1,638,009

TIPPING WAGON AND THE LIKE

Filed Jan.16, 1923   2 Sheets-Sheet 1

INVENTOR
Jean Etienne Felix Cambessédès
BY Townsend & Decker
ATTORNEYS.

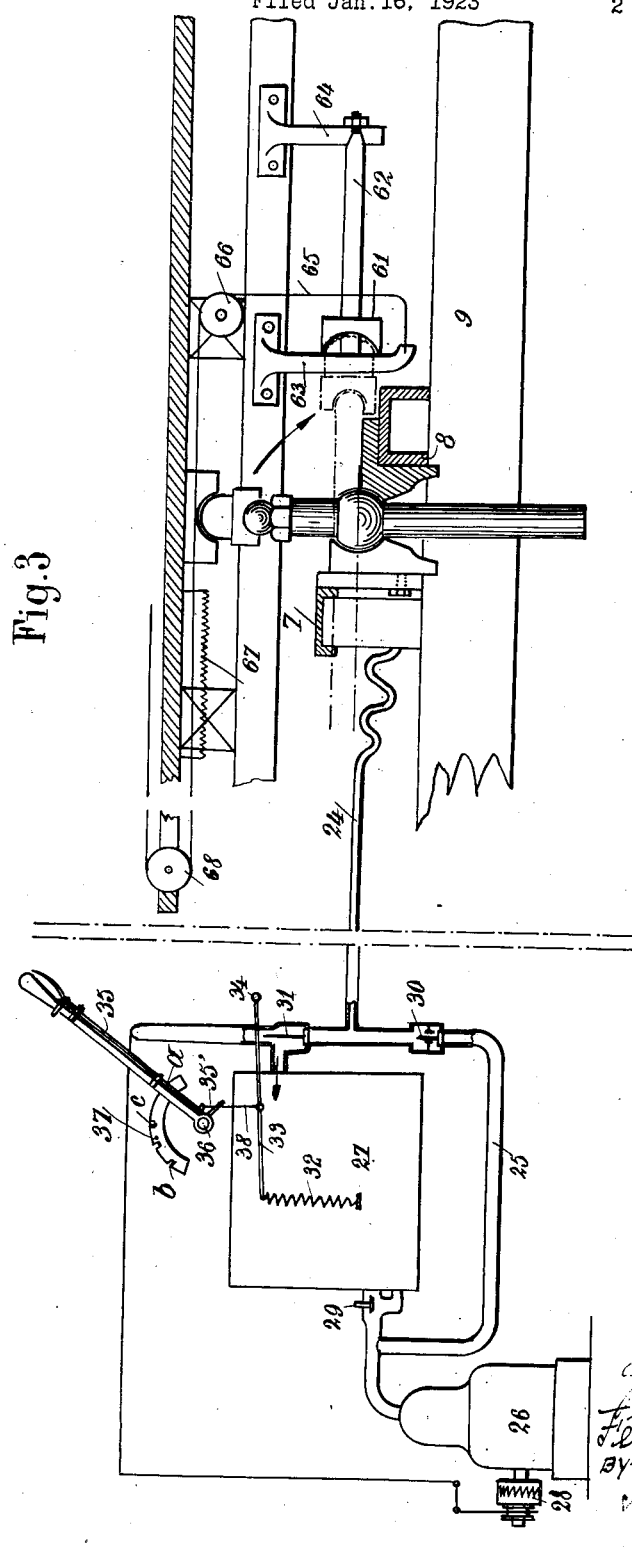

Patented Aug. 9, 1927.

1,638,009

UNITED STATES PATENT OFFICE.

JEAN ETIENNE FÉLIX CAMBESSÉDÈS, OF PARIS, FRANCE.

TIPPING WAGON AND THE LIKE.

Application filed January 16, 1923, Serial No. 612,908, and in France January 24, 1922.

This invention relates to vehicles such as automobile trucks, railway and tramway cars, and the like, intended for conveying minerals and other materials.

One of the objects of this invention is to provide a dumping mechanism for the body comprising one or more lifting jacks.

Another object is the disposition of the vehicle floor in such manner that it may be tilted to the rear or to either side.

Another object is to provide a tilting jack which may be swung about a pivot and used for movement in a horizontal direction.

A further object is to dispose the jacks in such manner that they do not move in a plane transverse of the vehicle during the operation of dumping the load.

Figure 1:
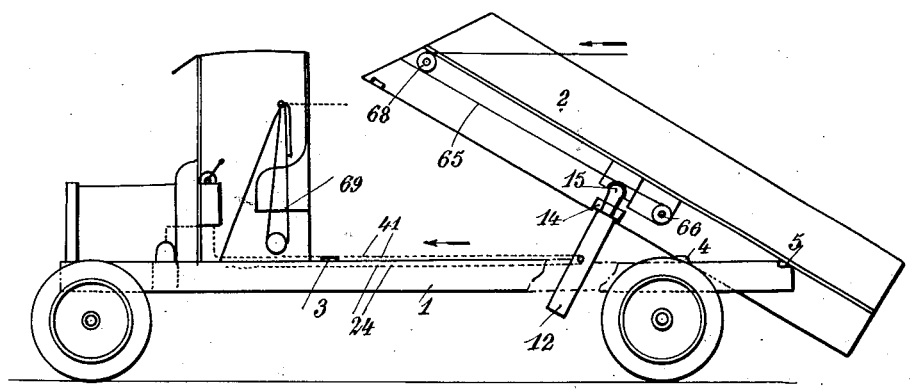
Figure 1:
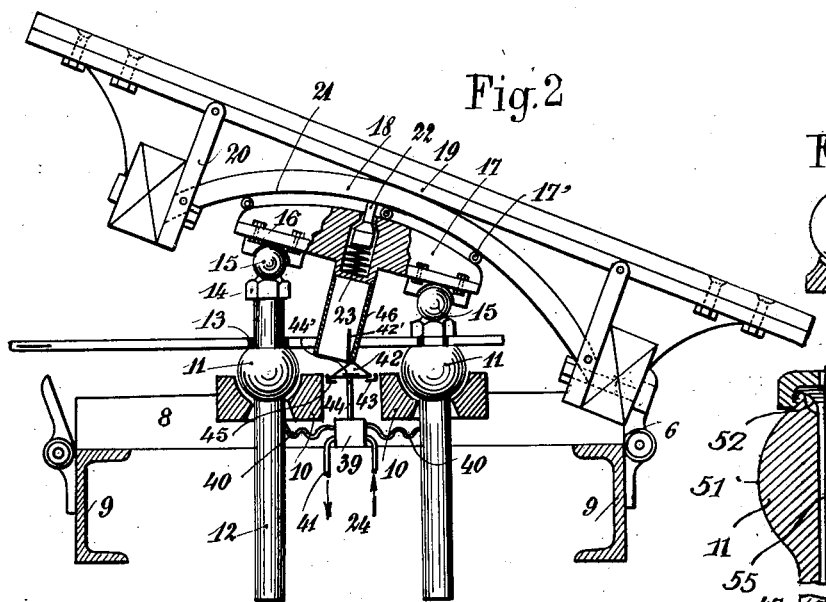
Figure 1:
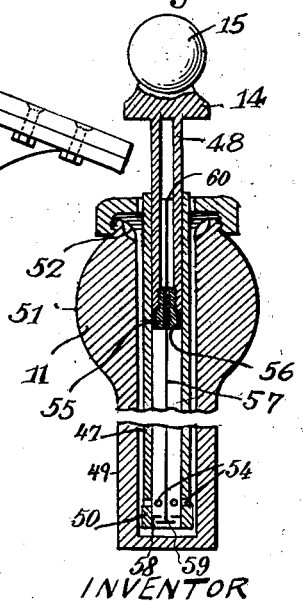

With these and other objects in view, one form of execution of my invention is represented on the accompanying drawings in which Fig. 1 is a side view of an automobile truck with its floor tilted backwards to discharge any material thereon. Fig. 2 is a transverse section on an enlarged scale, showing parts of the apparatus with the floor tilted sidewise. Fig. 3 is a side view, partly in section, of parts of the apparatus with the floor horizontal. Fig. 4 is a section of one of the hydraulic jacks.

The automobile truck to which the invention is applied in the modification shown comprises a chassis 1 and a platform or floor comprising the floor proper and the supporting timbers but shown conventionally at 2. This floor is pivoted to the chassis 1 by hinges 3, 4, and 5, which are located to permit the truck floor to be tilted to the rear or towards either side, and by construction permit a separation of the floor from the chassis at both sides, or at one side and the rear, or at both sides and the rear, so that they do not obstruct the free movement of the floor or the entire removal as the case may be. The interior surfaces of the hinges may be flat as shown at 6 in Fig. 2, to permit the floor to center itself while being lowered to its seat on the chassis.

The chassis 1 has the side bars 9, 9 and cross bars 7 and 8. To these cross bars are fastened the sockets 10 which receive the spherical heads 11 which form the supports for the telescopic hydraulic jacks 12. These sockets 10 are cut away so that the jacks can move into the position shown in dotted lines in Fig. 3.

These hydraulic jacks 12 are composed, as shown in Fig. 4, of the telescoping tubes 47, 48, which move one within the other and are protected by an outer casing 49 to which the operating liquid is admitted through the pipe 40. At the bottom of the tube 47 is a sleeve 50 which serves as a guide for the tube within the casing 49, and which comes against the ring protecting the cup leather 52 when the jack is fully expanded. 54 are the inlet and exhaust ports of the tube 47. 55 is a plug having a conical surface and is screwed into the tube 48; it serves to clamp the packing 56 used between the two tubes 47 and 48. Through this plug passes a rod 57 which has the enlarged ends 59 and 60 forming stops respectively against the washer 58 fastened in the bottom of the tube 47 and against the top of the plug 55. These stops serve to limit the relative movement of the tubes 47 and 48.

On the outer end of the inner telescoping tube 48 is a spherical head 15 surmounting a nut 14. In the lowered or collapsed position of the jack, this nut comes in contact with a spacing washer 13, and by adjusting these members the height of the top of the jack and its balance about the center of the head 11 may be regulated.

To the beam 19 and the brackets 20 on the lower side of the floor 2 is fastened a transversely and downwardly concave track 18. The spherical heads 15, 15 of the jacks are received in the cups 16 carried by a plate 17 having an upper convex form nesting with the track 18. Roller or ball bearings 17' may be interposed for freedom of movement of these members. The track 18 and rollers 17' or head 17 if the rollers are not employed may be guided in their relative movements by forming the track 18 as a channel as shown for example in Fig. 3. When in its normal or lowered position the cup 17 is disengaged from the slide 18 by a plunger 22 actuated by a spring 23.

The jacks are supplied with a liquid such as oil by a pipe 24 which serves both for inlet and exhaust, and is connected by a pipe 25 provided with a valve 30 to a pump 26 which is connected to a reservoir 27 through a valve 29. The pump 26 itself is of the piston or other intermittent type, has no valves, and is driven from the engine of the automobile truck through the clutch 28. Valves 29 and 30 are spring-held check valves disposed respectively to pass oil from the reservoir to the pump line, and from the pump line to the pipe 24 and valve 31; these two valves serve to deliver oil to and to receive it from the intermittently acting pump 26. The safety valve 31 is disposed at the outlet side of the pump line 25 and is weighted by a long armed lever 33 pivoted at 34 and by a spring 32; the power of spring 32, the relative lengths of the lever arms, and the cross-section of the passage of the valve 31 are calculated to withstand the oil pressure necessary to raise the jacks under full load.

The control system consists of a handlever 35 pivoted at 36 and movable over a sector 37 having three notches a, b, and c. This hand lever is actuated by hand from one position to another: in positions b and c, the clutch 28 is open, in position a it is closed and the pump delivers oil to the pipe 25. As the hand lever 35 is moved into the b position, the spur 35' strikes against the link 38 connected to the safety valve lever 33 and trips the safety valve to open it.

Between the two jacks and receiving oil from the pipe 24, is a valve 39 which has two outlets 40, 40 leading respectively to the jacks 12 and each composed of a spiral of tubing which permits rotation of the jacks as will be described hereafter; and the bypass or reflux pipe 41 which returns the oil to the reservoir 27. It will be understood that the oil pressure, in the open position of the valve, is maintained in the pipes 40, 40, while the excess quantity which otherwise would tend to raise the jacks still further is bypassed through 41. This valve 39 is controlled by the movement of the jacks through a rocking or wedge member 42 which is normally seated with its lower angles on angular supports 43, 45. The upper angle of the rocking member 42 terminates in an upstanding arm 42' which projects between the tines of the fork 46 fastened to the plate 17. The stem 44 of the valve 39 is pivoted to the rocking member 42 at 44'.

The method of operation is as follows:

Assuming that only the hinges 5 are locked to the floor and that those at 3 and 4 are unlocked, the operator moves the hand lever 35 into the notch a of the sector 37. The pump 26 is therefore coupled to the engine, and it alternately draws oil from the reservoir 27 through the valve 29 and discharges it through pipe 25 and valve 30. The flow from the valve 30 is regulated by the safety valve 31 which bypasses the oil when the pressure in the pipe 24 exceeds a predetermined limit. The oil normally is delivered through pipe 24 to the valve 39, in which it is distributed through pipes 40 to the jacks 12. Under the influence of the pressure of the oil, the telescoping tube 48 moves upwards and pushes the plate 17 and the floor 2 with it. In such case the jacks continue their upward extension until stopped by the rod 57. The pressure in the pipe line 24 then builds up until the safety valve 31 opens to relieve it, and then the jacks remain at the farthest extended position under the constant pressure thus afforded.

When the side hinges, say those at the right as in Fig. 2, are locked and the others are unlocked and the system is energized as before, the oil flows into the jacks 12 but owing to the restricted movement owing to the relative distances of the two jacks from the hinge pivots, the right hand jack does not expand to the same extent as the left hand one. They act on the plate to the same extent, but in this case the plate rolls along on the track 18 and pushes and tilts the floor sidewise into the position shown in Fig. 2. As the plate rolls along the track, the fork 46 encounters the arm 42' and rocks the wedge 42 counterclockwise about the lower left angle, thus causing a traction to be exerted on the rod 44, with an actuation of the bypass valve 39; the jacks are then at maximum elevation for sidewise tilting, and any further delivery of oil by the pump is bypassed by the valve 39 into pipe 41. It will be noted that the asymmetrical movement of the jacks results in a push having only a vertical component on the track, and that there is no tendency for the jacks to swing sidewise.

Should it be desired that the floor remain stationary at any angle other than the maximum, the hand lever 35 is moved to notch c in which the pump is uncoupled from the engine and the valve 31 remains closed. The pressure in pipe 24 is now static and the system remains stationary.

To return the floor to the horizontal position, the lever 35 is moved to notch b: the the pump is thus uncoupled from the engine, and the valve 31 is opened to permit a slow escape of the oil in pipe 24 and the jacks, back into the reservoir under the weight of the floor. Should a block occur in any of the oil pipes or there be a mistake in manipulation, the safety valve 31 will allow oil delivered by the pump to be returned to the reservoir, and thus accidents are prevented.

It will be understood that the floor is so shaped that when tilted rearwardly it can pass between the side-bars 9, so that material upon it may slide down onto the ground.

When the platform 2 is at rest and ready to be loaded with material, the jacks 12 and their cap 17 may be turned into a horizontal position. When the jacks 12 are now expanded the cap 17 presses upon a slider 61 which slides on bars 62 held on brackets 63, 64 carried by the platform, and which is normally drawn up against the bracket 63 by a rope 65 anchored to the bracket 63 and passing around a pulley 66 and secured to a spring 67. The slider when moved by the jacks, pulls on the rope 65, which may be passed around a second pulley 68 and used to drag goods onto the floor 2. When the pressure of the oil is cut off, the spring 67 returns the slider 61, the cap 17, and the jacks 12 to their normal position. It will be seen that the movement of the ropes is double that of the jacks. The tilting jacks may be used for many other purposes than loading the truck, for example, for actuating a crane 69 of any convenient type mounted on the chassis beside the driver's seat, or to work a grab.

According to the use to which the jacks are to be put, the parts of the apparatus may be modified, for instance, the jacks may be made capable of operating in other directions, or the parts 61 to 68 may be mounted on the chassis instead of on the floor.

The parts described above are given by way of example, and are capable of numerous modifications in detail. In particular the jacks may be rigidly mounted on the chassis. Also the two jacks may be rigidly arranged one behind the other so that the resultant of the forces exerted by them passes through the center of gravity of the load, their heads moving along a slide fastened to the floor and arranged parallel to the sidebars. Means may also be provided for supplying liquid to only one of the jacks at a time and for fixing them in any desired position. Lastly, the hinges 3, 4 and 5 may be of any suitable type and number.

I claim:

1. In a vehicle, the combination of a chassis, a floor hinged to the chassis, a plurality of jacks supported by the chassis for rocking movement about horizontal axes, a concave track fastened to the bottom of said floor, a plate having a convex portion connecting the upper movable portions of said jacks and adapted to move along said track, whereby the extension movement of said jacks in a rectilinear direction is converted to a tilting movement of said floor.

2. In a vehicle, the combination of a chassis, a body hinged to the chassis for tilting movement about a transverse or longitudinal axis, a plurality of transversely spaced jacks supported by said chassis and each including a movable member, a concave track secured to said body and extending for a substantial distance across the same, a convex plate secured across said movable members to space the same, said plate being constructed to slidably engage beneath said concave track to cause said body to be tilted.

3. In an apparatus for tipping the floor of a vehicle, two horizontally spaced jacks supported by the chassis of the vehicle, a plate connecting the heads of said two jacks, a curvilinear track fastened to the bottom of said floor and cooperating with said plate, means for pivotally connecting said floor and track to said chassis for selective pivotal movement about either of two independent axes and means for operating said jacks.

4. In an apparatus for tipping the floor of a vehicle, two horizontally spaced jacks supported by the chassis of the vehicle, a plate connected by means of articulations to the head of the jacks, a curvilinear track fastened to the bottom of the floor and cooperating with said plate, means for pivotally connecting said floor and track to the chassis of said vehicle for movement about either of two axes and means for disconnecting either of said means.

5. In an apparatus for tipping the floor of a vehicle, co-operating concave and convex members carried by said floor and the chassis of said vehicle respectively, an antifriction roller carried by one of said members and coacting with the other and a plurality of jacks for elevating said convex member relatively to said chassis.

In testimony whereof I affix my signature.

JEAN ETIENNE FÉLIX CAMBESSÉDÈS.